126,363

UNITED STATES PATENT OFFICE.

HESTER WHITELEY, OF PITTSBURG, PENNSYLVANIA.

IMPROVEMENT IN MEDICAL COMPOUNDS OR EYE-WASHES.

Specification forming part of Letters Patent No. 126,363, dated April 30, 1872.

SPECIFICATION.

*To all whom it may concern:*

Be it known that I, HESTER WHITELEY, of Pittsburg, in the county of Allegheny and State of Pennsylvania, have invented a new and useful Improvement in Medical Compound; and I do hereby declare the following to be a full, clear, and exact description thereof.

This compound I have designated *vitis vinifera*, from the botanical name of the vine from which the principal ingredient is derived. It is designed for use as an eye-wash, and from practical use it has been found to be of great benefit in restoring failing eyesight.

To enable others skilled in the art to prepare and make use of this improvement, I will proceed to describe the same.

The ingredients are sap of the grape-vine, *vitis vinifera*, (preferably of the common wild grape, sometimes called the flowering grape,) rose-water, and fluid extract of the common witch-hazel, *Hamamelis Virginica*.

In preparing it I take about one-eighth, by measure, of each of the two ingredients last named, and six-eighths of the ingredient first named. These ingredients unite readily, so that the compound is at once ready for use. They may be varied somewhat in amount, but the proportions set forth I consider the best. The fluid thus prepared is applied to the eye by dropping it into the inner corner of the eye or in other convenient way. I have found it by practical use to be of great effect in restoring the vision when impaired by age or constant use.

What I claim is—

The compound composed of the sap of the grape-vine, rose-water, and fluid extract of witch-hazel, substantially in the proportions and for the purposes set forth.

In testimony whereof I, the said HESTER WHITELEY, have hereunto set my hand.

HESTER WHITELEY.

Witnesses:
  E. B. HODGES,
  S. C. M'CANDLESS.